C. FULTON, dec'd.,

J. S. PERRY & G. SARD, Jr., Trustees, Assignees, by mesne assignments.

Stove.

No. 9,252. Reissued June 15, 1880.

*Witnesses:*

Geo. W. Wood

Geo. A. Smith

*Inventor:*

John S. Perry and George Sard Jr.
Assignees of Calvin Fulton
by Paul A. Duncan
Atty

N. PETERS, PHOTO-LITHOGRAPHER, WASHINGTON, D. C.

UNITED STATES PATENT OFFICE.

JOHN S. PERRY AND GRANGE SARD, JR., TRUSTEES, OF ALBANY, N. Y., ASSIGNEES, BY MESNE ASSIGNMENTS, OF CALVIN FULTON, DECEASED.

STOVE.

SPECIFICATION forming part of Reissued Letters Patent No. 9,252, dated June 15, 1880.

Original No. 89,304, dated April 27, 1869; Reissue No. 5,907, dated June 9, 1874. Application for reissue filed April 12, 1880.

*To all whom it may concern:*

Be it known that CALVIN FULTON, deceased, assignor, by mesne assignments, to JOHN S. PERRY and GRANGE SARD, Jr., trustees, both of the city and county of Albany, in the State of New York, did invent a new and useful Improvement in Stoves, of which the following is a full, clear, and exact description, reference being made to the accompanying drawings, in which—

Figure 1:
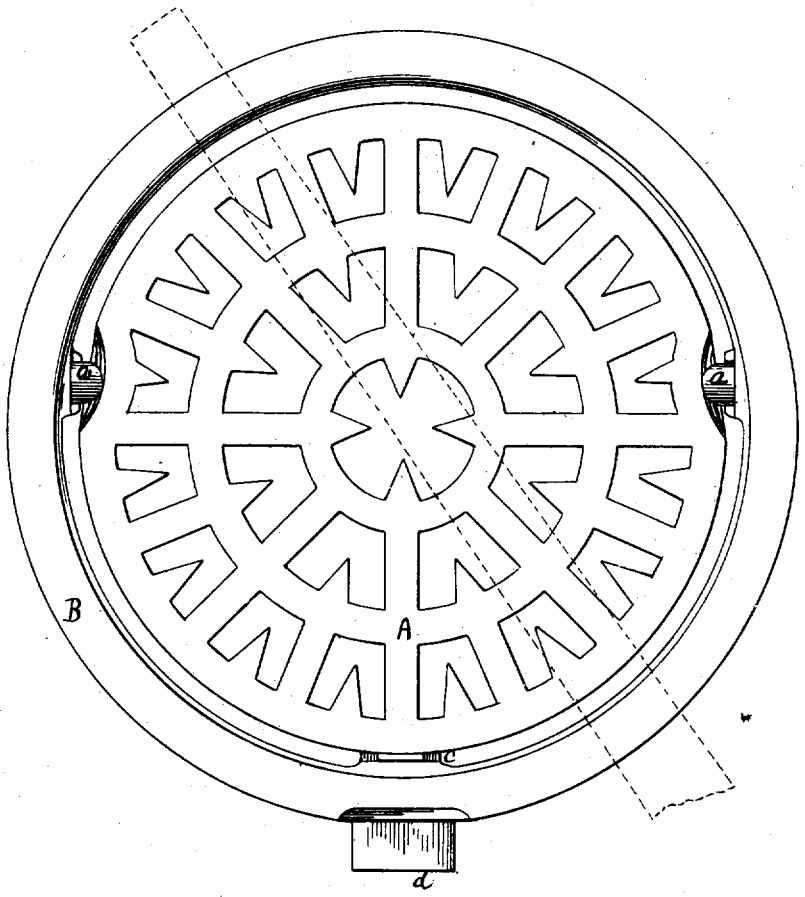
Figure 2:
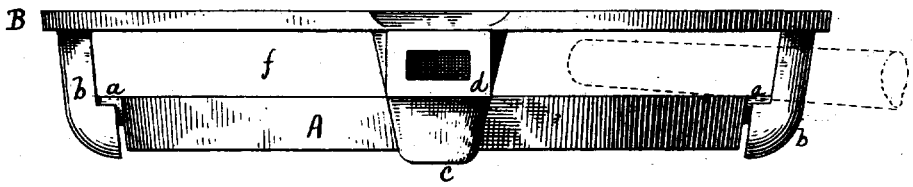

Figure 1 is a plan view illustrating the invention, and Fig. 2 is an elevation of the same.

The invention consists, in general, in so constructing and arranging the grate or fire-bed of a stove as to leave above the plane of its upper surface, around its edge, an open space for the removal of clinkers and other refuse, and in which, for this purpose, an ordinary straight poker or slicer may be inserted horizontally and freely worked from side to side. A grate so arranged can be conveniently supported, in the manner shown in the drawings, by means of a ring provided with suitable hangers for receiving the journals of the grate, and, through its connection with such supporting-ring, the grate can be made to receive a horizontal rotary vibration, and at the same time, by means of its journals, it will be capable of being dumped.

In the drawings, A indicates the grate proper; B, a supporting-ring. The grate proper is of the usual circular form, with its bearings or journals *a a* set a little back from the center, so as to bring the preponderance on one side, (at the front of the grate,) to prevent accidental dumping, the front edge of the grate being made to rest on a stop, *c*. This supporting-ring B is simply a circular ring resting on suitable bearings in the stove, and capable of being shaken or vibrated laterally, for which purpose it is provided with a socket, *d*, to receive the shaking-iron. It is also provided with hangers or depending bearings *b b*, to receive the journals *a a* of the grate.

The main feature of novelty in this invention is the special arrangement of the grate with reference to the adjacent parts of the structure in which it is used, this arrangement being such that a free open space is left between the grate and the lower end of the fire-chamber or fuel-receptacle for the insertion and free lateral movement of the poker, and in connection with this clinker-opening there exists, as a further feature of novelty, the capacity of the depressed or sunken grate for horizontal rotary vibration. The poker, as variously inserted, is shown in dotted lines.

By the foregoing construction and arrangement the clogging of the stove by clinkers and other refuse is, to a great degree, obviated, as the simple vibration of the grate will readily cause the ashes and the smaller refuse to be discharged over its edge, while the clinkers or larger refuse, when required, can be removed by the use of the poker, which can be inserted through the space *f* and be made to sweep the grate or fire-bed from side to side. This lateral discharge of the spent coal and clinkers, whether by the use of the poker or by the rotation of the grate, is facilitated by the flat character of the grate-surface, as this construction of the grate practically permits every part of its surface to be readily cleaned.

It is demonstrated by practical use that there is no danger of the escape of coal, even of the smaller sizes, through the space *f*.

The great advantage resulting from the present invention, as will readily appear, is that the fire-bed can be kept free from dead matter, and thus the fire be perpetuated indefinitely, without the necessity of dumping the grate. The grate need be dumped only when, through carelessness or accident, the fire has gone out, or when, for other reasons, it becomes necessary to remove the contents of the fire-pot or fuel-holder.

It is known that prior to this invention stoves had been constructed in which the grate occupied a position within the lower end of the fire-pot, but in which a small portion of the lower part of the fire-pot or fuel-receptacle next the grate and at the front had been cut away, thus leaving a small aperture, through which it was proposed to draw out clinkers by the use of a hook; but such a construction manifestly must be greatly inferior to one in which the grate is sunk bodily below the fuel-receptacle; or the parts are so constructed and arranged as to leave an opening of such size that the clinkers can be swept off from the surface with an ordinary straight poker. The ease and facility of operating the latter far exceed that of the former, and at the same time the work can be more thoroughly done, and is attended with far less waste of live coal.

It is also known that a stove-grate and a supporting-ring had been used before; also, that stoves had been made in which the grate was placed below the base of the fuel-receptacle; but in such earlier constructions, so far as is known, the grate was not so related to the neighboring parts that it could be kept free from clinkers and other refuse simply by the use of the ordinary poker or slicer, as provided for by the present invention.

What is claimed as new is—

1. A stove-grate so constructed and arranged relatively to the fire-chamber or fuel-receptacle as to leave between the two and around the edge of the grate a free open space, and to permit of the removal of clinkers and other refuse through such space by use of the ordinary poker or slicer, substantially as described.

2. A rotating stove-grate with flat upper surface, and otherwise so constructed and arranged relatively to the fire-chamber or fuel-receptacle as to leave between the two, around the edge of the grate, a free open space, through which the spent coal and other refuse may be discharged laterally by the rotation of the grate, substantially as described.

3. The combination of the grate A and the ring B, substantially as described, the grate being sunken so as to leave the space *f*, and having an independent dumping action, as set forth.

JOHN S. PERRY,
GRANGE SARD, JR.,
*Trustees.*

Witnesses:
FRANKLIN A. TREADWELL,
JOHN T. PERRY.